(12) United States Patent
Heren

(10) Patent No.: US 12,683,454 B2
(45) Date of Patent: Jul. 14, 2026

(54) POWER SUPPLY COMPRISING A HYDRAULIC MACHINE EXHIBITING IMPROVED INTEGRATION

(71) Applicant: Poclain Hydraulics Industrie, Verberie (FR)

(72) Inventor: Jean Heren, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 323 days.

(21) Appl. No.: 18/266,708

(22) PCT Filed: Dec. 2, 2021

(86) PCT No.: PCT/FR2021/052180
§ 371 (c)(1),
(2) Date: Jun. 12, 2023

(87) PCT Pub. No.: WO2022/123149
PCT Pub. Date: Jun. 16, 2022

(65) Prior Publication Data
US 2024/0044279 A1 Feb. 8, 2024

(30) Foreign Application Priority Data
Dec. 11, 2020 (FR) ...................................... 2013067

(51) Int. Cl.
| | |
|---|---|
| *H02K 5/20* | (2006.01) |
| *F04B 39/06* | (2006.01) |
| *F04B 53/08* | (2006.01) |
| *F16H 61/4165* | (2010.01) |
| *H02K 9/19* | (2006.01) |

(52) U.S. Cl.
CPC ........... *H02K 5/203* (2021.01); *F04B 39/064* (2013.01); *F04B 53/08* (2013.01); *F16H 61/4165* (2013.01); *H02K 9/19* (2013.01)

(58) Field of Classification Search
CPC .... F04B 39/064; F04B 53/08; F16H 61/4165; H02K 5/203
See application file for complete search history.

(56) References Cited

U.S. PATENT DOCUMENTS

| | | | | |
|---|---|---|---|---|
| 6,201,365 B1 * | 3/2001 | Hara | ......................... | B60L 1/02 |
| | | | | 903/952 |
| 10,391,854 B1 * | 8/2019 | Keller | .................... | B62D 11/04 |
(Continued)

FOREIGN PATENT DOCUMENTS

| | | | | |
|---|---|---|---|---|
| EP | 2378122 A2 * | 10/2011 | ............ | F04C 29/045 |
| JP | 2002227645 A | 8/2002 | | |
(Continued)

OTHER PUBLICATIONS

International Search Report of International Application Serial No. PCT/FR2021/052180 dated May 11, 2022, (w/ English Translation).

*Primary Examiner* — Matthew Wiblin
(74) *Attorney, Agent, or Firm* — Lippes Mathias LLP

(57) ABSTRACT
A system having a primary machine, a hydraulic machine, and a frequency converter disposed in an assembly casing. The system further includes a cooling circuit, suitable for a same coolant to traverse a plurality of ducts suitable for cooling the primary machine, the frequency converter, and the hydraulic machine.

9 Claims, 6 Drawing Sheets

(56)          References Cited

U.S. PATENT DOCUMENTS

| | | | | |
|---|---|---|---|---|
| 12,334,800 B2 * | 6/2025 | Fernandez | ............... | B60K 1/00 |
| 2007/0270263 A1 * | 11/2007 | Gotz | ........................ | B60K 6/46 |
| | | | | 475/5 |
| 2011/0123367 A1 * | 5/2011 | Jordan | .................... | F04B 35/04 |
| | | | | 417/363 |
| 2012/0161554 A1 * | 6/2012 | Ghelardi | ................ | H02K 11/33 |
| | | | | 310/54 |
| 2018/0331594 A1 * | 11/2018 | Yagyu | ........................ | F28F 1/16 |

FOREIGN PATENT DOCUMENTS

| | | | |
|---|---|---|---|
| WO | WO 2012066067 A2 | 5/2012 |
| WO | WO 2013068419 A1 | 5/2013 |
| WO | WO 2017055137 A1 | 4/2017 |
| WO | WO 2019182622 A1 | 9/2019 |

* cited by examiner

POWER SUPPLY COMPRISING A HYDRAULIC MACHINE EXHIBITING IMPROVED INTEGRATION

BACKGROUND OF THE DISCLOSURE

The present disclosure relates to power supply units comprising a hydraulic machine coupled to a primary machine, and particularly electric pump units which can for example be used in hydraulic systems, in particular in hydrostatic transmissions.

STATE OF THE ART

The integration of the different components is an important parameter in the automotive field, for heavy vehicles and various types of machinery. The integration of the components is generally emphasized according to the market volume, particularly due to the costs related to the improvement of integration.

This results, in particular, in a lesser degree of integration of systems having more segmented markets, which frequently leads to a plurality of individual components. This includes hydraulic machines which are widely used, but for applications in fairly small series. However, it will be understood that a lesser degree of integration of the different components can cause many problems, ranging from a possible cooling defect, or increased risks of breakage or pull-out due to the required links, to possible exposure to the ambient environment.

Specifically, power supply units composed of non-integrated elements have logic and power links, either fluid or electrical, which are bulky, liable to be pulled out, and can make airborne and structure-borne noise, and also have bulk due to peripherals, and a non-smooth surface appearance.

This summary thus aims to make provision for a system comprising a hydraulic machine and a primary machine at least partly addressing these problems.

SUMMARY OF THE DISCLOSURE

This summary thus relates to a system comprising: a primary machine, a hydraulic machine and a frequency converter disposed in an assembly casing, said system being characterized in that it comprises a cooling circuit, suitable for a same coolant to traverse a plurality of ducts suitable for cooling the primary machine, the frequency converter and the hydraulic machine.

According to an example, the coolant is identical to a work fluid of the hydraulic machine.

According to an example, the primary machine comprises a primary casing, the hydraulic machine comprises a machine casing, the primary casing and the machine casing being secured to one another, and comprising inner ducts communicating at an interface between the primary casing and the machine casing, allowing the passage of the coolant between the primary casing and the machine casing.

All or part of said inner ducts can then be produced in such a way as to provide the circulation of coolant in planes perpendicular to an axis of the primary machine. According to an example, the frequency converter comprises a converter casing, and wherein the primary casing and the converter casing are secured to one another, the cooling circuit comprising ducts positioned between the primary casing and the converter casing.

According to an example, the primary casing comprises ducts formed in a segment of said primary casing coming into contact with the converter casing, said ducts forming part of the cooling circuit.

According to an example, the primary machine is a motor, for example an electric motor, for example a DC or AC electric motor. For example a single-phase or three-phase AC motor. For example a synchronous three-phase AC motor with a permanent magnetic or variable reluctance. The electric motor can also, for example, be asynchronous with a squirrel cage or a wound rotor.

The motor can be a radial or axial flux motor. Particularly a radial flux electric motor.

According to an example the electric motor is an electric motor that rotates in air: the rotor and the stator are separated by air and not oil.

According to an example, the hydraulic machine is a volumetric machine (or positive displacement machine), i.e. which forms the link between a through fluid flow and a mechanical movement entering or exiting through a succession of closed volumes. According to an example, the hydraulic machine is a hydraulic pump or a hydraulic motor suitable for operating by means of a work fluid, which enters the hydraulic machine at a first pressure and exits it at a second pressure, distinct from the first pressure, for example a piston hydraulic pump, a radial piston hydraulic pump, a multilobe cam radial piston hydraulic pump, or a bent axis or swashplate hydraulic pump, it being understood that such a system is typically reversible, and that the hydraulic machine can also operate as a motor, the primary machine then fulfilling the function of a generator.

According to an example, the assembly casing comprises means for attaching to a support, said attaching means being equipped with shock-absorbing elements.

According to an example, the assembly casing comprises an intake port and a discharge port connected to the cooling circuit for the circulation of the coolant in the assembly casing, and an intake port and a discharge port connected to an intake and a discharge of the hydraulic machine for the circulation of a work fluid of the hydraulic machine.

BRIEF DESCRIPTION OF THE DRAWINGS

The invention and its advantages will be better understood on reading the detailed description given hereinafter of different embodiments of the invention given by way of non-limiting example.

In all the figures, elements in common are identified by identical reference numbers.

DETAILED DESCRIPTION OF THE PREFERRED EMBODIMENTS

There will now follow a description of an exemplary embodiment of the invention with reference to FIGS. 1 to 6.

Figures 1, 2:
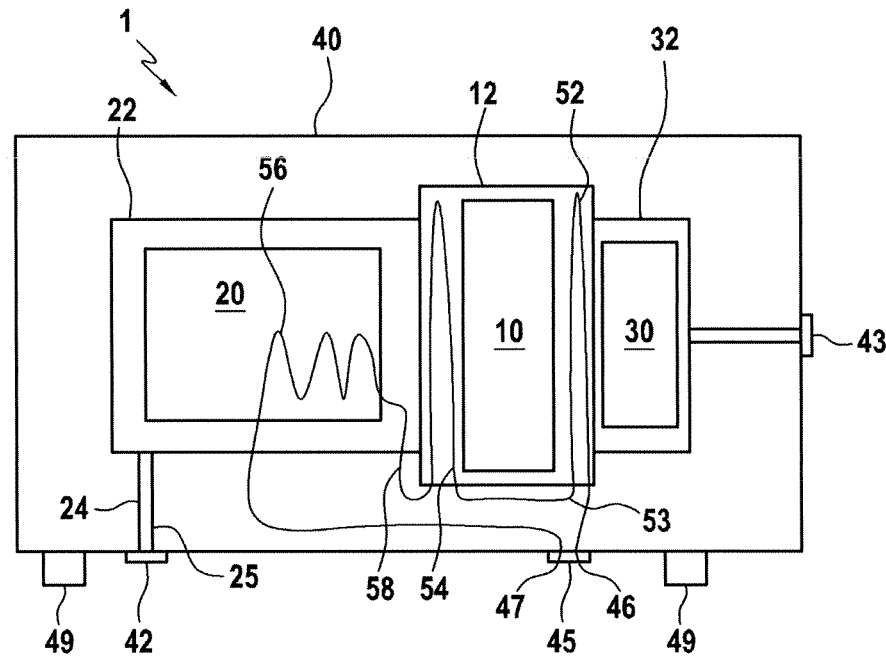
FIG. 1 is a schematic representation diagram of a system according to an aspect of the invention disclosure.
FIG. 2 is a view schematic diagram of an exemplary embodiment of the disclosure.
Figure 3:
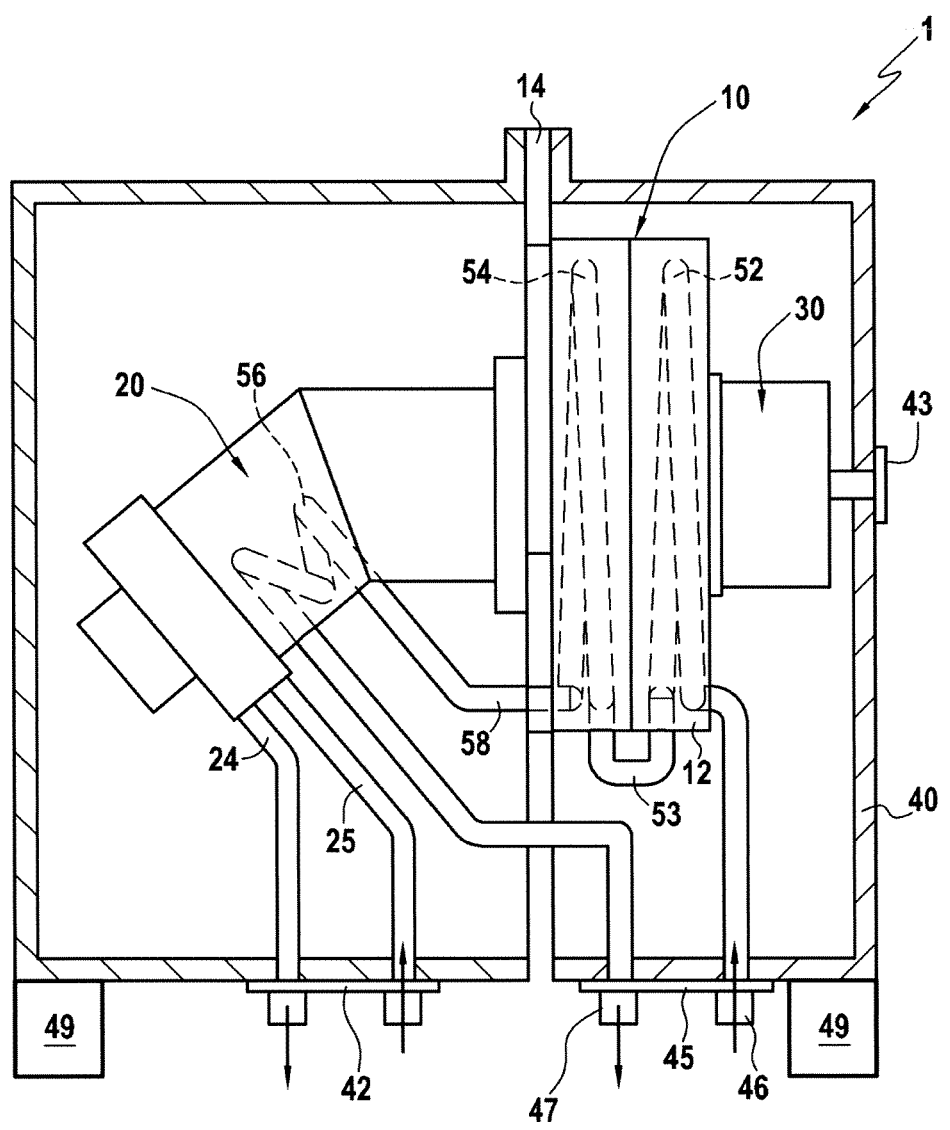
FIG. 3 is a cross-sectional view of an exemplary embodiment of the disclosure.

The figures schematically represent a system 1 according to this summary, comprising a primary machine 10, a hydraulic machine 20 and a power converter 30 disposed in an assembly casing 40. FIG. 1 is a schematic representation of such a system 1, FIG. 2 shows a variant thereof, while FIGS. 3 to 6 illustrate a particular exemplary embodiment.

The hydraulic machine 20 is typically a hydraulic pump, for example a piston hydraulic pump. More generally, the hydraulic machine 20 comprises a barrel or a cylinder block having a plurality of housings through which pistons slide, said pistons also being in abutment, for example against a plate. The primary machine 10 is typically an electric motor. The primary machine 10 is typically configured in such a way as to drive a shaft of the hydraulic machine 20.

The primary machine 10 can for example be an axial flux electric motor, for example an axial flux motor containing a disk bearing magnets and two stators bearing the winding elements. Alternatively the axial flux motor can be composed of N disks bearing the magnets and 2N stators including the winding elements, N being a natural integer number greater than or equal to 2.

The primary machine 10 comprises a primary casing 12, the hydraulic machine 20 comprises a machine casing 22 and the power converter 30 comprises a converter casing 32.

In a first mode of operation, the primary machine 10 is typically coupled to the hydraulic machine 20 such that a shaft of the primary machine 10 then drives a shaft of the hydraulic machine which then operates as a pump. The shaft of the hydraulic machine 20 can for example be coupled to the shaft of the primary machine 10 by means of inner and outer splines which then engage, or by another adapted means. It will be understood that a reverse operation is also possible; the hydraulic machine 20 can operate as a motor which then rotationally drives the shaft of the primary machine 10 which in this case becomes an electric generator, for example for the purpose of releasing energy in the case of a reversible system.

As schematically represented in FIG. 1, the primary machine 10 is typically positioned between the hydraulic machine 20 and the power converter 30.

More precisely, the machine casing 22 is typically secured to the primary casing 12, and the converter casing 32 is typically also secured to the primary casing 12, such that the hydraulic machine 20 and the power converter 30 are for example on either side of the primary machine 10.

In the example shown in FIGS. 3 to 6, the primary casing 12 comprises attaching segments such as attaching tabs 14 to which the assembly casing 40 is attached. In such an embodiment, the primary casing 12 therefore provides the link between the assembly casing 40, the power converter 30 and the hydraulic machine 20. It will however be understood that other variants are possible, for example by attaching the assembly casing 40 to the machine casing 22 and/or to the converter casing 32.

The assembly casing 40 typically comprises an intake and a discharge of work fluid of the hydraulic machine 20. In the illustrated example, the intake and the discharge are grouped together on an interface 42 to which hydraulic machine ducts 24 and 25 are connected allowing entrances and exits of work fluid of the hydraulic machine 20. The term "work fluid of the hydraulic machine" should here be understood to mean the fluid that enters the hydraulic machine 20 at a first pressure and leaves it at a second pressure, distinct from the first pressure, after being passed, in particular, through inner ducts and the housings of a barrel or a cylinder block of the hydraulic machine 20. The work fluid is thus to be distinguished from the coolant, which is typically at a substantially constant pressure which is for example different from the pressure of the work fluid, is isolated from the work fluid (with the exception of leaks), and in particular does not enter into the housings of the barrel or of the cylinder block of the hydraulic machine through which the pistons slide.

The assembly casing 40 typically comprises an electrical interface 43, for example in the form of a plate comprising electrical connections which are connected for example to the power converter 30 and/or to the primary machine 10.

The system as proposed comprises a cooling circuit cooling the power converter 30, of the primary machine 10, and of the hydraulic machine 20.

The assembly casing 40 thus has an intake and a discharge for a coolant. In the illustrated example, the assembly casing 40 comprises an exchange interface 45 having an intake port 46 and a discharge port 47 for a coolant. It will however be understood that the intake port 46 and the discharge port 47 can be positioned in separate areas of the assembly casing 40.

The system 50 comprises a cooling circuit 50 connected to the intake port 46 and to the discharge port 47. The cooling circuit 50 as proposed is a shared cooling circuit, which will cool the power converter 30, the primary machine 10 and the hydraulic machine 20 with one and the same coolant. The coolant is for example the same fluid as the work fluid of the hydraulic machine, for example oil.

FIG. 1 schematically represents an example of a cooling circuit 50 according to an aspect of the invention.

Figure 4:
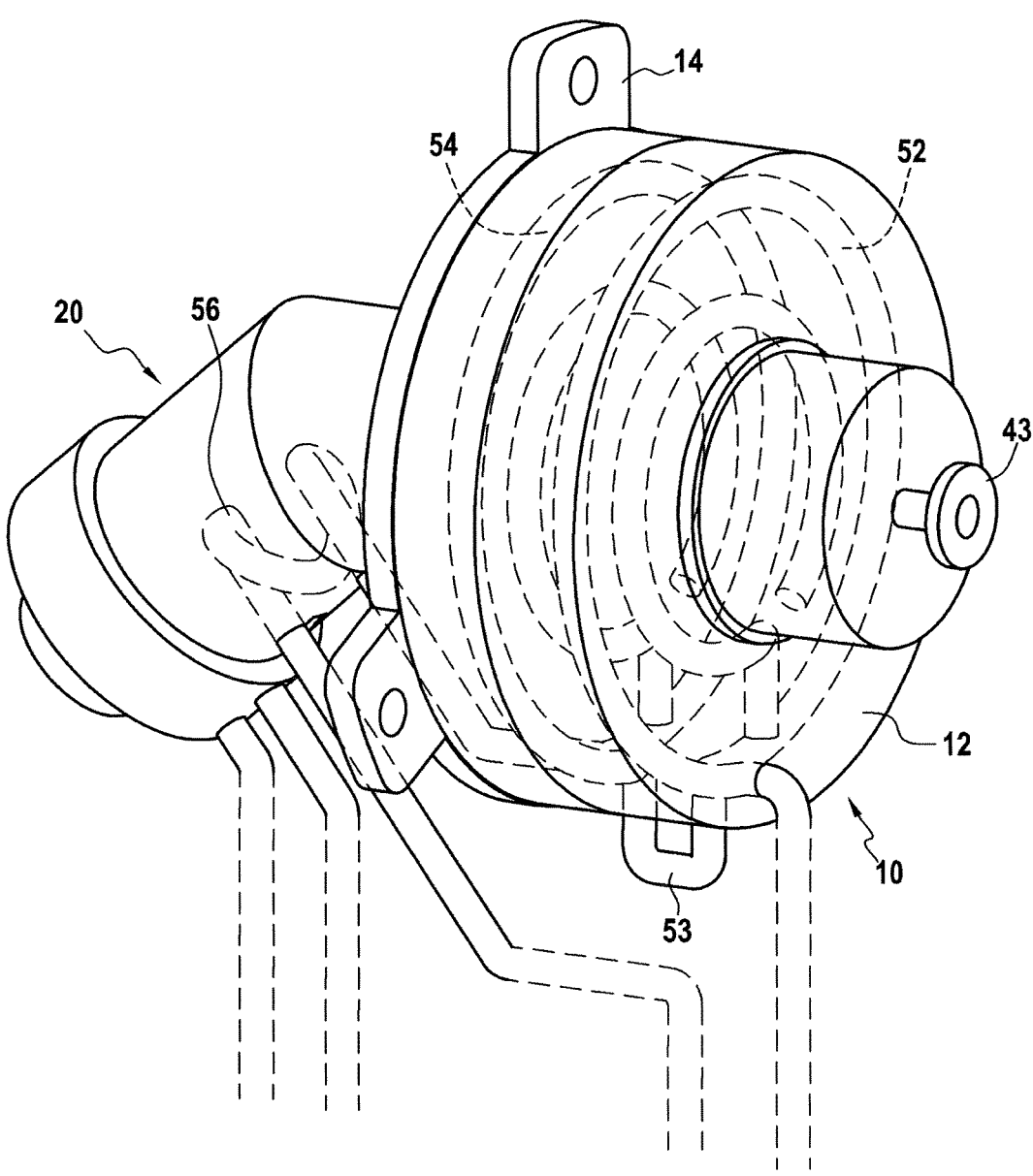
FIG. 4 is another a perspective view of an exemplary embodiment of a casing of the disclosure.
Figure 5:
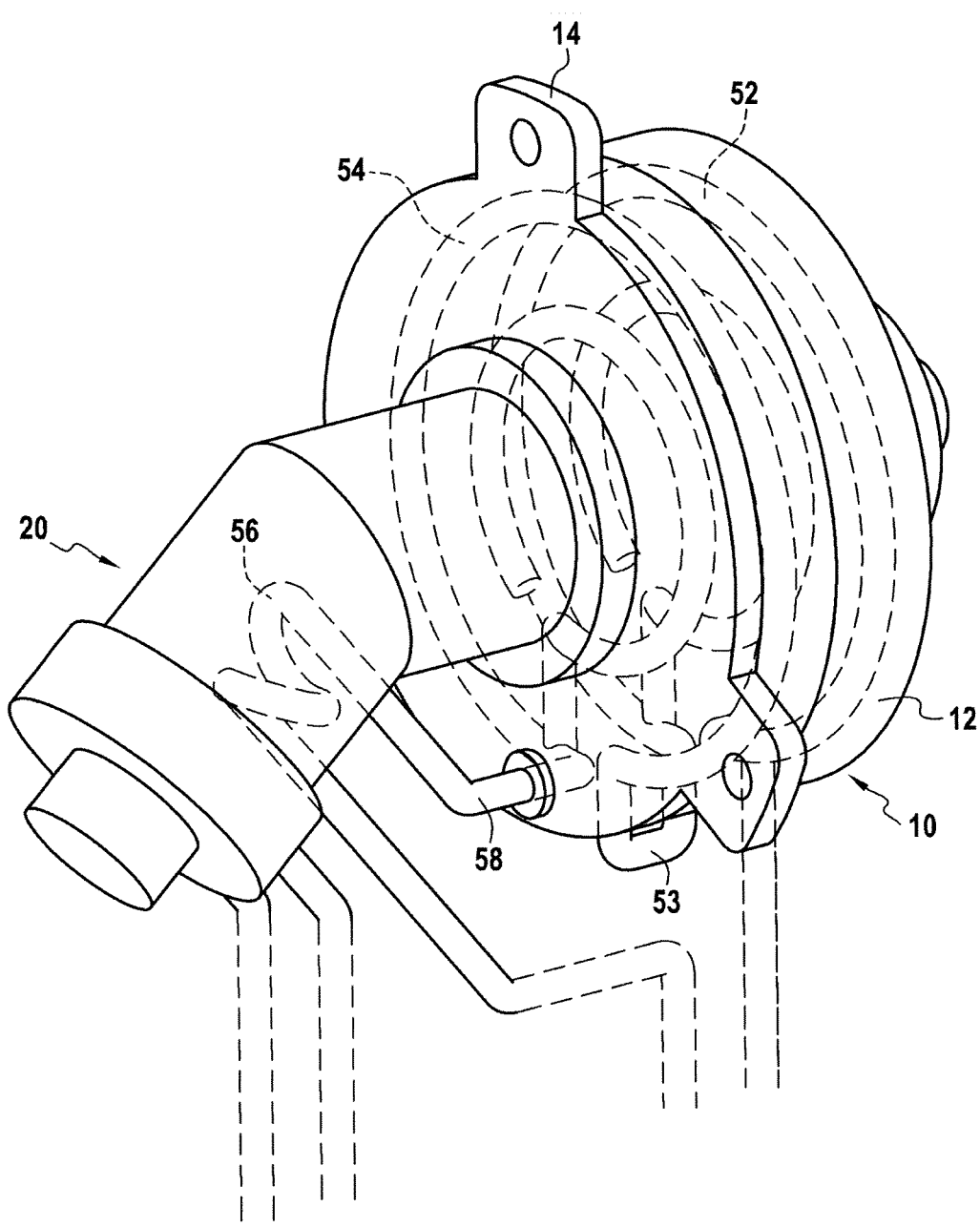
FIG. 5 is another perspective view of an exemplary embodiment of a casing of the disclosure.
Figure 6:
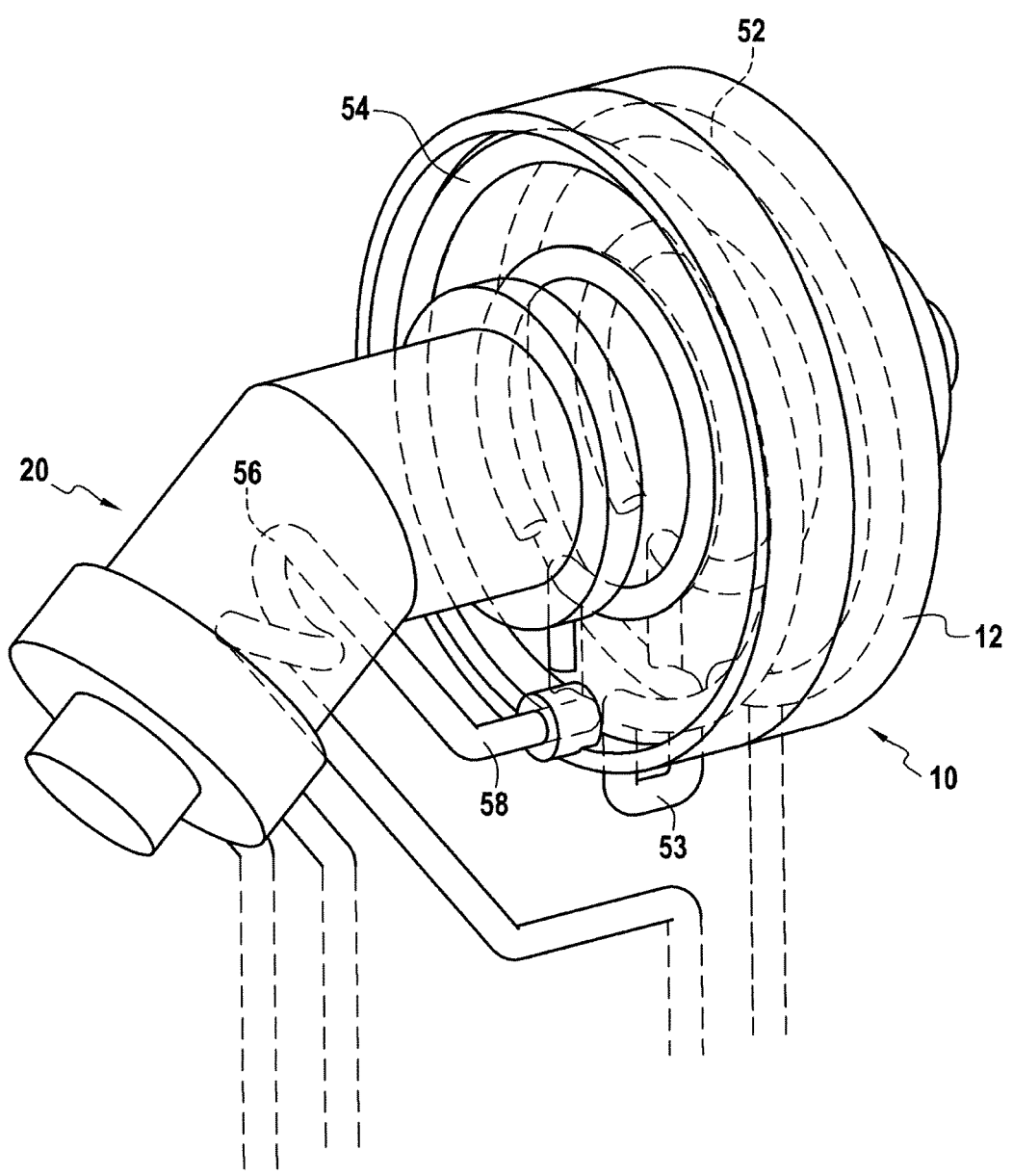
FIG. 6 is another perspective view of an exemplary embodiment of a casing of the disclosure.

As schematically represented, the primary casing 12 comprises inner ducts 52 and 54 adapted for allowing the circulation of the coolant. These inner ducts 52 and 54 are typically respectively formed in a portion of the primary casing 12 forming the interface with the power converter 30, and in a portion of the primary casing 12 forming the interface with the hydraulic machine 20. FIGS. 4 and 5 represent such an embodiment wherein the inner ducts are formed in portions of the primary casing 12, for example by molding. These two figures show the primary casing 12, a cowling of which, forming the interface with the power converter 30 (for FIG. 4) and with the hydraulic machine 20 (for FIG. 5), has been removed to leave the inner ducts 52 and 54 visible. In a variant, the inner ducts 52 and 54 can be formed in the walls of the primary casing 12 which then does not comprise such cowlings.

In the embodiment illustrated in the figures, the link between these inner ducts 52 and 54 is embodied by a duct 53 connecting these two opposite faces of the primary casing 12. This duct 53 is here protected from the outer environment by the assembly casing 40. The duct 53 is for example a flexible duct.

In general, the outer ducts (as opposed to the inner ducts, i.e. the ducts which are not formed in the primary casing 12, in the machine casing 22 or in the converter casing 32) can be produced in the form of flexible ducts, which offers the advantage of easy assembly, and which is particularly beneficial in the context of the invention since these products are by definition fragile and are advantageously protected by the assembly casing 40. The flexible ducts thus make it possible to accommodate the vibrational movements between the different parts of the system. However, alternatively, it is possible to use rigid ducts.

In a variant, adapted ducts can be positioned to ensure the circulation of the coolant at the interface between the primary casing 12 and the power converter 30, the ducts then being formed in an intermediate part between said casings, and not directly in a portion of the primary casing 12.

In the case where the primary machine 10 comprises several disks bearing the magnets and the double stator so that each disk is surrounded by two stators bearing the winding elements, it can also be envisioned for one of the interfaces allowing the passage of the coolant to be an interface between two stators of the axial flux motor. FIG. 2 shows such a variant. By comparison with FIG. 1 described previously, here it is possible to fashion an inner duct 55 formed in the primary machine 10, between the inner ducts 52 and 54, in such a way as to ensure the circulation of the coolant between the two rotors or the two stators of the primary machine 10. It will be clearly understood that this embodiment can be generalized for a primary machine 10 comprising any number of inner ducts 55 interposed between the inner ducts 52 and 54, particularly according to the structure of the primary machine 10 and more precisely according to the number of disks and stators it comprises.

It will be understood that the system as proposed is particularly adapted for primary machines such as axial flux motors composed of segments of stators and of rotors, in that it makes it possible to make an efficient cooling link both within the stators of the primary machine 10 and to the hydraulic machine 20 and the power converter 30 with few parts and a high degree of compactness. The compactness of the proposed system also allows for a reduction in the radiated noise.

The hydraulic machine 20 also comprises inner ducts 56 for allowing the circulation of the coolant. In the example illustrated in FIGS. 3 to 6, the link between the inner ducts 54 of the primary machine 10 and the inner ducts 56 of the hydraulic machine 20 is embodied by a duct 58 connecting a port which opens from the primary casing 12 and a port formed in the machine casing 12. As a variant, the primary casing 12 and the machine casing 22 can have inner ducts communicating with an interface between the primary casing 12 and the machine casing 22, the passage of the coolant between these casings being thus internal to these casings.

The link between these different inner ducts 52, 54 and 56 can be embodied via ducts internal to the different casings, or via outer connections to the casings such as ducts, for example flexible ducts, these latters then being protected from the outside environment by the assembly casing 40. The different inner ducts and the elements providing their respective links thus form the cooling circuit of the system 1 as shown.

The different ducts forming the cooling circuit 50 typically have a labyrinth shape, to increase the exchange surface and thus improve the cooling provided.

One such embodiment can be seen in FIGS. 4 and 5 in which the inner ducts 52 and 54 fashioned in the primary casing 12 have labyrinth shapes.

All or part of the different inner ducts forming the cooling circuit 50 are typically formed in such a way as to define circulations of coolant extending along different planes perpendicular to an axis of the primary machine 10.

The cooling circuit 50 as proposed embodies the following circulation for the coolant:

the coolant enters via the intake port 46, it then circulates in the inner duct 52, located at the interface between the primary machine 10 and the power converter 30, it then circulates in the inner duct 54, located at the interface between the primary machine 10 and the hydraulic machine 20, it then passes into the inner ducts 56 formed in the hydraulic machine 20, it meets the discharge port 47.

The cooling circuit as proposed thus makes it possible to provide cooling, first of the primary machine 10 and of the power converter 30, then of the hydraulic machine 20 by means of one and the same coolant.

Figure 7:
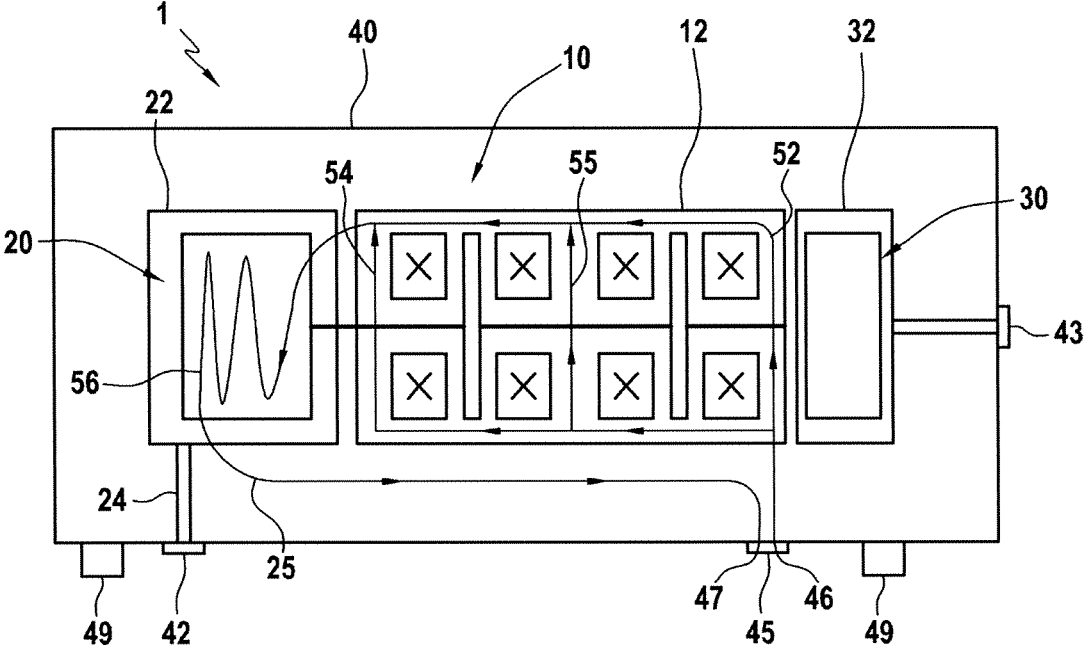
FIG. 7 is a schematic diagram view of another exemplary embodiment of the disclosure.

FIG. 7 is a variant of FIG. 2.

In this variant, the cooling circuit embodied in the primary machine 10 is embodied according to a parallel structure, as opposed to the embodiment schematized in FIG. 2 wherein the cooling circuit has a series assembly. In the example shown in FIG. 7, the inner ducts 52, 55 and 54 are powered mounted in parallel. It will be understood that this embodiment can be generalized for any number of inner ducts in the primary machine 10. For example for an embodiment not having the inner duct 55, the inner ducts 52 and 54 are then assembled in parallel. Similarly, the cooling circuit 50 can have any number of inner ducts 55 between the inner ducts 52 and 54, the parallel structure then being similar to that shown in FIG. 7.

The operation is here similar to the operation already described with reference to the preceding figures, with the difference that the cooling is here done more homogenously between the different inner ducts 52, 55 and 54 as opposed to the embodiment shown in the preceding figures wherein the inner duct 54 is supplied by a coolant which is already heated due to its previous passage through the inner ducts 52 and where applicable 55. The coolant flow rate can also be increased without requiring a considerable increase of pressure upstream.

The coolant is then typically sent back to a heat exchanger, a filtering device or a reservoir typically equipped with a cooler, which can be an ambient-pressure reservoir which can be shared with work fluid. The injection of coolant via the intake port 46 can be done using a hydraulic pump, for example via a feed pump coupled with a closed-loop hydraulic circuit associated with the hydraulic machine 20 insofar as the coolant is identical to the work fluid of the hydraulic machine 20. It can also be a hydraulic pump that can be described as "low-pressure" or else a hydraulic pump for accessories or for driving actuators.

The assembly casing 40 typically comprises attaching means 49 such as studs, coated in a suitable material for absorbing vibrations such as rubber. The attaching means 49 thus allow the attachment of the system 1 to an appliance or a machine, while limiting the transmission of vibrations.

The assembly casing 40 is typically closed and is advantageously sealed in such a way as to protect the elements it contains from the ambient environment, and also to limit the propagation of the noise generated by the different inner elements of the assembly casing 40. The assembly casing 40 can have an inner face covered with a material suitable for absorbing or limiting the transmission of sound, for example a honeycomb material.

The system as proposed thus makes it possible to improve the integration of the components of a system such as an electric pump. The different components are positioned within one and the same assembly casing 40 making it possible to protect them from the ambient environment, and to share the cooling circuit 50 between these different components, which reduces the number of ducts and surfaces, which minimizes the radiated noise. The system as proposed thus makes it possible to reduce airborne and structure-borne noise. It will in particular be understood that such a sharing of the cooling circuit makes it possible to avoid having to integrate several separate cooling circuits into one and the same system, which is highly advantageous in terms of bulk. More precisely, the compactness of the assembly makes it possible to reduce the total bulk of the system, and to easily put in place an assembly casing. Elements housed in the assembly casing are protected, which reduces the risks of breakage or pull-out of hydraulic or electrical ducts, including during transportation and storage. Moreover, the smaller number of components makes it possible to reduce the cost and improve reliability.

Moreover, the fact of using one and the same fluid as the working fluid for the hydraulic machine 20 and as the coolant for the cooling circuit 50 of the system 1 makes it possible to avoid having several fluids which are not necessarily mixable in a same system. The use of different fluids is particularly complex in terms of implementation for ensuring the non-mixing of fluids, and is problematic in terms of integration and maintenance due to the increased number of elements such as fluid reservoirs.

The system as proposed thus addresses a recurring problem remaining unsolved at the present time, particularly for power units such as electric pump units.

Although this invention has been described with reference to specific exemplary embodiments, it is obvious that modifications and changes can be made to these examples without departing from the general scope of the invention as defined by the claims. In particular, individual features of the different embodiments illustrated/mentioned can be combined in additional embodiments. Consequently, the description and drawings must be considered in an illustrative sense rather than a restrictive one.

It is also obvious that all the features described with reference to a method are transposable, alone or in combination, to a device, and conversely, all the features described with reference to a device are transposable, alone or in combination, to a method.

The invention claimed is:

1. A system comprising:

a primary machine, a hydraulic machine and a frequency converter disposed in an assembly casing, said system comprises a cooling circuit, adapted for a same coolant to go through a plurality of ducts adapted for cooling the primary machine, the frequency converter and the hydraulic machine wherein the coolant is identical to a work fluid of the hydraulic machine wherein said working fluid is oil, and wherein the assembly casing comprises an intake port and a discharge port connected to the cooling circuit for the circulation of the coolant in the assembly casing, and an intake port and a discharge port connected to an intake and a discharge of the hydraulic machine for the circulation of said work fluid of the hydraulic machine.

2. The system as claimed in claim 1, wherein the primary machine comprises a primary casing, the hydraulic machine comprises a machine casing, the primary casing and the machine casing being secured to one another, and comprising inner ducts communicating at an interface between the primary casing and the machine casing, allowing the passage of the coolant between the primary casing and the machine casing.

3. The system as claimed in claim 2, wherein all or part of said inner ducts are produced in such a way as to provide the circulation of the coolant in planes perpendicular to an axis of the primary machine.

4. The system as claimed in claim 3, wherein the frequency converter comprises a converter casing, wherein the primary casing comprises ducts formed in a segment of said primary casing coming into contact with the converter casing, said ducts forming part of the cooling circuit.

5. The system as claimed in claim 2, wherein the frequency converter comprises a converter casing, and wherein the primary casing and the converter casing are secured to one another, the cooling circuit comprising ducts positioned between the primary casing and the converter casing.

6. The system as claimed in claim 1, wherein the primary machine is an electric motor.

7. The system as claimed in claim 6, wherein the primary machine is an axial flux electric motor.

8. The system as claimed in claim 1, wherein the hydraulic machine is a hydraulic pump or a hydraulic motor adapted for operating by means of a work fluid, which enters the hydraulic machine at a first pressure and exits it at a second pressure, distinct from the first pressure.

9. The system as claimed in claim 1, wherein the assembly casing comprises means for attaching to a support, said attaching means being equipped with shock-absorbing elements.

* * * * *